Aug. 23, 1966   M. J. DE GOOD ETAL   3,268,061
CONTINUOUS AND REVERSIBLE VERTICAL CONVEYOR
Original Filed July 31, 1964   6 Sheets-Sheet 1

FIG. 1.

INVENTORS
MAYNARD J. DE GOOD
CLYDE L. BOWMAN
BY
ATTORNEYS

INVENTORS
MAYNARD J. DE GOOD
CLYDE L. BOWMAN
BY
Price & Heneveld
ATTORNEYS Aug. 23, 1966  M. J. DE GOOD ETAL  3,268,061
CONTINUOUS AND REVERSIBLE VERTICAL CONVEYOR
Original Filed July 31, 1964  6 Sheets-Sheet 3

INVENTORS
MAYNARD J. DE GOOD
CLYDE L. BOWMAN
BY
ATTORNEYS

Aug. 23, 1966  M. J. DE GOOD ETAL  3,268,061
CONTINUOUS AND REVERSIBLE VERTICAL CONVEYOR
Original Filed July 31, 1964  6 Sheets-Sheet 6

INVENTORS
MAYNARD J. DE GOOD
CLYDE L. BOWMAN
BY
ATTORNEYS

United States Patent Office 3,268,061
Patented August 23, 1966

3,268,061
CONTINUOUS AND REVERSIBLE VERTICAL CONVEYOR
Maynard J. De Good and Clyde L. Bowman, Grand Rapids, Mich., assignors to The Rapids-Standard Company, Inc., Grand Rapids, Mich., a corporation of Michigan
Continuation of applications Ser. No. 386,718, July 31, 1964, and Ser. No. 437,131, Mar. 4, 1965. This application Oct. 20, 1965, Ser. No. 505,588
18 Claims. (Cl. 198—153)

This invention relates to conveyors, and more particularly to a continuous chain lift.

This application is a continuation of both United States patent application Serial No. 386,718 filed July 31, 1964, entitled Continuous Vertical Lift, and of United States patent application Serial No. 437,131, filed March 4, 1965, now abandoned, entitled Reversible Continuous Vertical Conveyor.

Continuous chain lifts are old in the art. This invention constitutes an improvement on prior chain lifts. The invention permits the lift to be built from a substantially lesser number of components, and with a substantially reduced structure. This has the advantage of reducing the initial cost of such equipment. It also simplifies the equipment. This simplicity results in less maintenance, less replacement and less down time. Thus, the equipment is more durable and more dependable. This also significantly reduces its operating cost. These are important factors, particularly where the equipment is incorporated in a partially or fully automatic system. These systems are common today and represent the major use of equipment of this type. Even though the lift constitutes a minor portion of many of these systems, any failure on its part results in a major shutdown because the rest of the system is responsive to the failure of the lift to carry out its assigned duty.

This invention produces equipment which is quieter in operation. This is becoming a matter of increasing concern in many industrial plants. While noise arising from operations has until recently been basically disregarded in industry, it is now being recognized as an important factor in attempting to create a more efficient working environment. The equipment is rapid in operation, yet at the same time, it handles the articles gently, reducing to a minimum losses due to breakage or other forms of damage.

Chain vertical conveyors are particularly desirable in many operations because they can be accurately timed as to their sequence of handling articles. They are also capable of handling heavy loads often far in excess of any other type of equipment of comparable cost and simplicity. They are basically compact, requiring a minimum of plant space. This is often an important factor in conveyor design. Their capabilities include a wide range of variations in lift height without complex variations in structural design.

This invention constitutes an improvement over our copending application, Serial No. 386,718 filed July 31, 1964, entitled Continuous Vertical Lift, in that its direction of operation is fully reversible. The form of this invention originally disclosed in application Serial No. 386,718 can be reversed, but this requires a substantial down time since a number of mechanical changes have to be made each time a directional change is desired. The form of this invention originally disclosed in application Serial No. 437,131, now abandoned, permits immediate direction reversal simply by reversing the direction of rotation of the prime mover. This materially increases the usefulness of the device. The fully reversible form of the invention accomplishes its purposes with a structure of somewhat simpler and less costly design. For purposes of clarity only, the form of the invention originally disclosed in application Serial No. 386,718 will hereinafter be referred to as "monodirectional" and the form of the invention originally disclosed in application Serial No. 437,131 will be referred to as "reversible."

These and other objects and advantages of this continuous chain conveyor will be understood by those acquainted with the engineering and design of conveyor systems upon reading the following specification and the accompanyig drawings.

In executing the invention, the continuous conveyor is equipped with a pair of primary chains and a pair of secondary chains. The primary chains traverse an L-shaped path, one side of the vertical portion of which serves as the lifting or lowering portion of the conveyor, and the horizontal portion as the receiving platform for the elevator. The secondary chain travels a closed vertical loop and serves only to cooperate with the vertical portion of the primary chain in effecting lifting or lowering of the flexible carriages.

The flexible carriages are arranged at equally spaced intervals and at one end are secured to the primary chains. These carriages are capable of flexing only in one direction. Their other ends rest on suitable dogs or fingers on the secondary chains during vertical travel.

At the upper end of the conveyor, in the monodirection form of this invention, the trailing end of each carriage is transferred from the dogs of the secondary chains to rails along which it slides as it is pulled toward the primary chains. Means are provided to cause the trailing end of the carriage to hook onto suitable hanger bars on the primary chains for return travel. As the carriages enter the upper portion of the platform portion of the elevator, they are caused to stretch out and unhook from the hanger bars and thus are free to be lifted by the dogs of the secondary chains as they move into the vertical portion of the lift.

In the reversible form of this invention, at the lower end or horizontal portion of the conveyor, rails are provided to support the free ends of the carriages as they move toward or away from the secondary chains. The primary chains are provided with clamping plates which hold the carriages to the primary chain when the carriages are returning empty and are unsupported by the secondary chains. The secondary chain through its lift bars confines the carriage on one side while the primary chain and flanges confine the carriage on the other side.

*Description of FIGS. 1–9*

Figure 1:
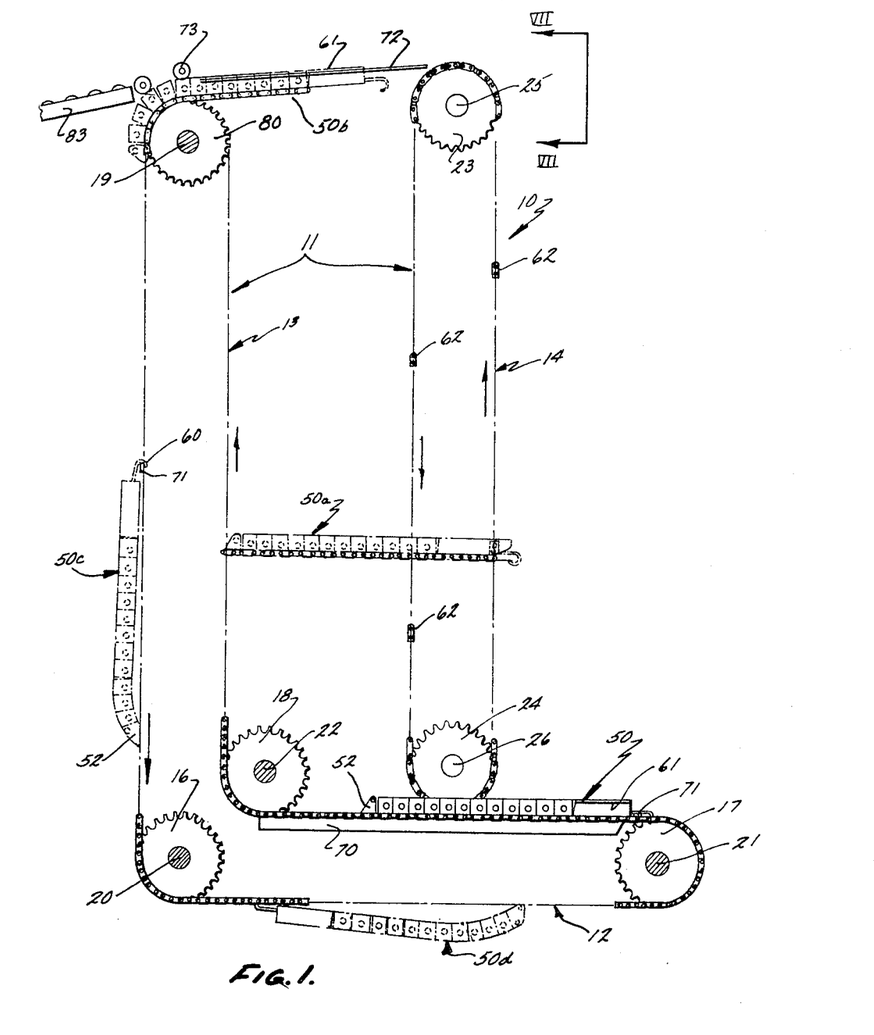
FIG. 1 is a schematic side elevation view of the monodirection form of this invention.

Referring specifically to FIG. 1, the numeral 10 indicates a vertical conveyor having a vertical or lift portion 11 and a loading or platform portion 12. The vertical conveyor has a pair of primary chains 13 and a pair of secondary chains 14. The chains of the primary pair are arranged in parallel, laterally spaced relationship. The chains are of identical length. The same is true of the chains of the secondary pair 14. The primary and secondary chains are arranged in the same vertical planes on each side of the conveyor.

The chains of the primary pair 13 each pass over an upper primary sprocket 15 (FIGS. 1 and 2), an outer corner sprocket 16, a lower primary sprocket 17, and an inner corner sprocket 18. It will be understood that each of these sprockets are arranged in pairs, one for each of the primary chains. The upper primary sprockets 15 are mounted on a common shaft 19, the outer corner sprockets 16 are mounted on a common shaft 20, and the lower primary sprockets 17 are mounted on a common shaft 21. The inner corner sprockets 18 are individually mounted each on a stub shaft 22. It will be seen from the arrangement of these sprockets that these chains traverse an L-shaped path, with the horizontal or platform portion 12 at the bottom, and the lift or vertical portion 13 at one end of the conveyor.

The pair of secondary chains 14 each pass over upper terminal sprockets 23 and lower terminal sprockets 24. The terminal sprockets 23 are each mounted on a stub shaft 25 and the lower terminal sprockets 24 are each mounted on a stub shaft 26. The terminal sprockets 25 and 26 are vertically aligned and are of identical diameter. Thus, the secondary chains traverse a closed vertical path, there being no horizontal portion of travel except that which constitutes their arcuate path around the terminal sprockets. All of the shafts 19, 20, 21, 22, 25 and 26 are mounted to a suitable rigid frame structure such as the frame 28 illustrated fragmentarily in FIG. 2. Thus, their spacing and relative position with relation to each other is fixed. The frame is not illustrated except for the fragmentary showing in FIG. 2 since it can be any one of a large number of conventional structures, all of which are well-known. The frame does not in and of itself form any part of this invention.

Figures 7, 8, 9:
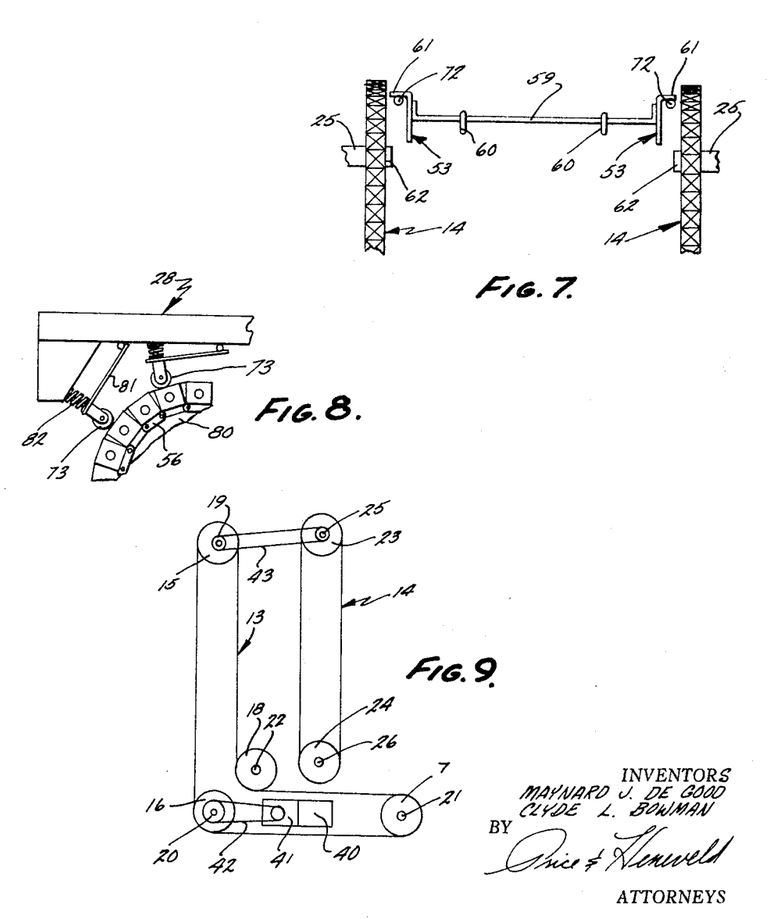
FIG. 7 is a fragmentary, elevation view of the top of the conveyor taken along the plane VII—VII of FIG. 1.
FIG. 8 is a fragmentary, enlarged, side elevation view of the discharge end of the top of the chain of the conveyor shown in FIG. 1.
FIG. 9 is a schematic side elevation view of the drive mechanism for the monodirectional form of this invention.

As illustrated in FIG. 9, the shaft 20 for the outer corner sprockets 16 of the primary chains 13 is driven by a prime mover 40 through a gear reducer 41 and the drive chain 42. The secondary chains 14 are driven through the power transmission chains 43 which interconnect the shafts 19 and 25 at the top of the elevator. A pair of the chains 43 are provided, one on each side of the conveyor. It will be understood that a number of different arrangements for driving the primary and secondary chains may be utilized in connection with this invention without in any way affecting the principles of the invention itself.

Figure 3:
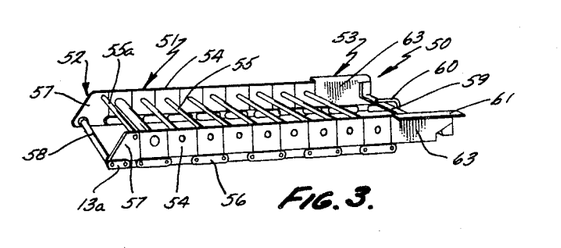
FIG. 3 is an oblique view of the carriage used with the monodirectional form of this invention.
Figure 4:
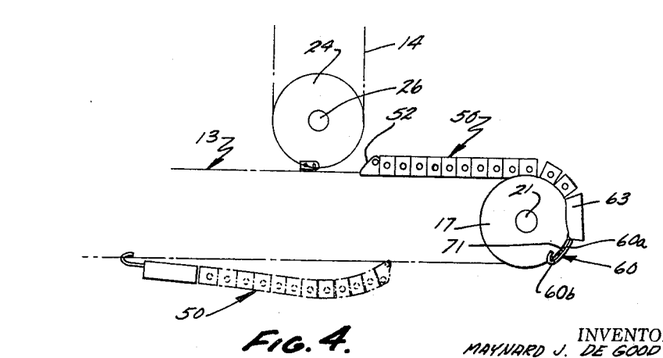
FIG. 4 is a fragmentary, schematic, side elevation view showing the carriages as they enter the article receiving portions of the conveyor shown in FIG. 1.

The conveyor has a plurality of flexible carriages 50. These are best illustrated in FIG. 3. Each of the carriages is made up of a plurality of intermediate links 51, a lead link 52 and a trailing or end link 53. Each of the intermediate links 51 consists of a pair of side plates 54, connected by a cross rod 55. Each of the intermediate links, along its lower side is permanently secured to a carriage link 56 of such length that it will hinge or pivot with the next link about a point which is aligned with the vertical ends of the side plates 54. A plurality of the intermediate links 51 are employed in each carriage and they are connected together only by the carriage links 56 along their lower edges. Thus, the carriage is flexible in one direction about an axis parallel with the cross rods 55 by reason of the pivotal action between the links 56. The direction of flexing is away from the upper surface of the carriage. The edges of the side plates are parallel and vertical. The purpose of this will be explained subsequently.

The carriage also has a lead link 52 consisting of a pair of side plates 57, connected both by a cross rod 55a and an anchor rod 58. The ends of the anchor rod 58 extend through the side plates 57 and each end is secured to a link 13a of each of the primary chains 13. Only the link 13a of the primary chains is shown in FIG. 3 to illustrate this attachment.

Figure 2:
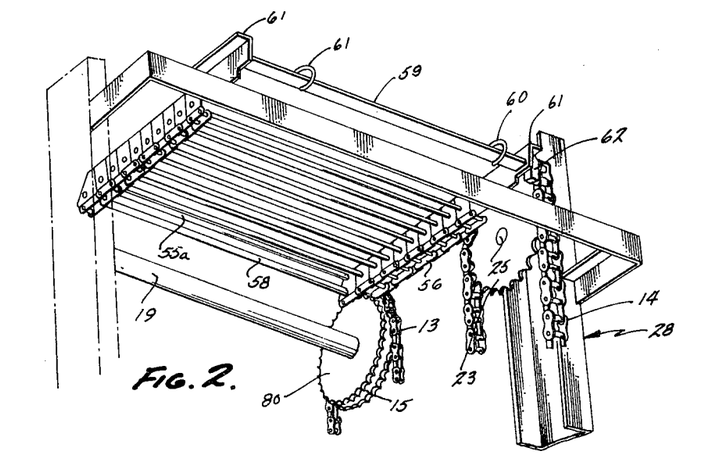
FIG. 2 is a fragmentary, partially schematic, oblique view of the upper end of the monodirectional form of this invention, viewed from beneath.

At its trailing end the carriage has an end link 53 consisting of a pair of end plates 63 connected by a base bar 59. Mounted on the base bar are a pair of laterally spaced, downwardly curved hooks or support members 60 (FIGS. 2 and 3). The end link is substantially longer than the intermediate links 51. The tops of the end plates 63 are bent outwardly to form a pair of wings or ears 61.

Both the lead link 52 and the end link 53 are secured to their adjacent intermediate links 51 by a carriage link 56, and thus, like the intermediate links are flexible with respect to the rest of the carriage. Also, the vertical edge of these links facing the adjacent carriage links is vertical. When the carriage assumes a horizontal position with the cross rods 55 forming the upper surface of the carriage, the side walls of the intermediate links 51, front link 52 and end link 53 abut each other and thus, the carriage locks up forming a rigid, horizontal platform held together by the carriage links 56. However, if the platform is bent in the opposite direction, the carriage will flex about the ends of the links 56, and thus, pass over the outside of the various sprockets about which the primary chain travels. Articles enter the carriage from the rear, that is from the end having the end link 53. The cross rod 55a is raised above the rods 55 to form a stop to prevent articles over-shooting the carriage. The remaining rods 55 are all in the same plane and form an article supporting surface.

The end link 63 has only one carriage link 56 and projects rearwardly substantially beyond the end of this. The purpose of this will be explained subsequently.

The carriage 50 has a width less than the lateral spacing between the chains of both the primary and secondary pairs 13 and 14. Thus, the carriage basically is seated between the primary and secondary chains. The wings 61 project beyond the sides of the carriage and their outer edges are spaced apart a distance slightly less than the spacing between the primary and secondary chains 13 and 14. This permits them to be engaged by the lift dogs or members 62 on the secondary chains without interference between the edges of the wings and the secondary chains themselves. The wings are spaced above the primary chains sufficiently to permit the dogs 62 to get beneath the wings without interfering with the primary chains.

The carriages being secured only to the primary chains 13 and then only at the forward or lead end of the carriages are pulled along the top run of the platform portion 12 of the primary chain 13. It will be recognized that a plurality of the platforms 50 are used in each continuous vertical conveyor. These are spaced at equal intervals along the primary chains 13. In the particular arrangement illustrated, five of them are shown. These are identified as platforms 50, 50a, 50b, 50c and 50d (FIG. 1).

Figure 5:
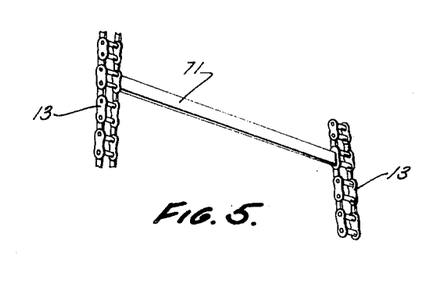
FIG. 5 is a fragmentary, oblique view of the hanger bar of the primary chains of the conveyor shown in FIG. 1.
Figure 6:
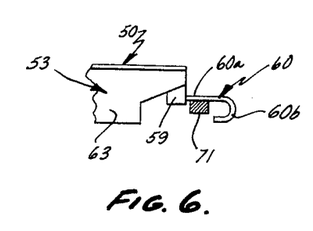
FIG. 6 is a fragmentary, enlarged, side elevation view of the trailing end of the carriage resting on the hanger bar of the conveyor shown in FIG. 1.

To describe the remaining structure and the operation of the device, it is considered best to trace the movement of one of the platforms through a complete cycle. For this purpose, the platform 50 illustrated in FIG. 1 is chosen. In the position illustrated in FIG. 1, platform 50 is in article receiving position. In this position, its front end is supported at the lead link 52 by the primary chains 13. The rear or trailing edge of the platform is supported on one of the hanger bars 71 (FIGS. 1 and 6). In the area of the platform 12, the upper run of the primary chains is supported by any suitable means such as the beams 70. Thus, the platform is firmly supported in a horizontal or substantially horizontal position and the surface formed by the cross rods 55 is flat. The hanger bars are simply bars affixed to the primary chains and extending between them as illustrated in FIG. 5. One hanger bar is provided for each carriage 50.

When a carriage is in the position illustrated by carriage 50, actual contact between the hanger bar 71 and the carriage occurs by means of the straight portion 60a of the hook resting on the bar. It will be noted that the straight portion 60a is longer than the width of the bar 71, and in the particular position of the carriage illustrated in FIGS. 1 and 6, the hook portion 60b is shifted rearwardly of the hanger bar, permitting the rear or trailing end of the carriage to be lifted off the hanger bar without interference by the hook. This is important. This positioning of the curled or hooked portion 60b of the hook is caused by the spacing between the point of attachment of the lead links 52 to the chains and the hanger bar 70. This spacing is fixed since it is controlled by the primary chains 13. This is in excess of the spacing between the inner end of the hooked portion 60b and the point of attachment of the lead link 52 to the chain. This distance is variable since the carriage 50 is flexible. The primary chains 13 are driven in the direction of the arrows in FIG. 1.

As the leading end of the carriage 50 approaches the inner corner sprockets 18, a pair of the lift dogs 62, horizontally aligned, will pass downwardly beneath the ears 61 of the end link 63 of the carriage 50. This downward movement will be just ahead of the ears and just as soon as the dogs have passed beneath the ears, the continued movement of the carriage will bring the ears over the dogs. As the lead link 52 of the carriage starts to pass upwardly about the inner corner sprockets 18, the lifting dogs 62 will come up beneath the ears 61, lifting the trailing end of the carriage 50 off the platform portion of the primary chains 13. The length of the ears 61 is such that as the lifting dogs 62 move outwardly away from the primary chains 13 as the secondary chains travel in the direction indicated by the arrows in FIG. 1, the lifting dogs will slide along beneath the ears, but will not be shifted so far as to disengage them.

The position and rate of movement of the lifting dogs 62 is such that the carriage is always held in a horizontal position while it is supported for vertical movement by both the primary and secondary chains 13 and 14. Once the leading edge of the carriage has passed the vertical axis of the stub shafts 22 and the trailing edge has passed the vertical axis of the stub shafts 26, the carriage will be suspended from its front and rear ends in a horizontal position, and the upward movement of the chains will carry the carriage to the top of the conveyor. The carriage 50a in FIG. 1 is illustrated as being in the process of being lifted up the conveyor.

When the carriage reaches the top of the conveyor, its forward end will start over the top of the upper primary sprockets 15 at approximately the same time as the lifting dogs 62 reach their maximum elevation. In the particular embodiment illustrated, the upper primary sprockets 15 are slightly below the upper terminal sprockets 23. This will incline the carriage slightly forwardly for purposes of load discharge. As the carriage continues to move forwardly, the trailing end of the carriage will be pulled off the lifting dogs 62 and will immediately come to rest on the two rails 72 (FIGS. 1 and 7). While the rails are slightly below the top of the upper terminal sprockets 23, the distance is such that the forward end of the ears 61 will come to rest on them before the lifting dogs 62 have traveled downwardly sufficiently to release the trailing end of the carriage. In other words, the trailing end of the carriage will be placed on the rails rather than dropped on them. As the trailing end of the carriage moves across the top of the conveyor, the wings 61 will slide along the rails 72.

As the forward end of the carriage passes about the upper primary sprockets 15, the carriage folds to enter the downward portion of the return run. As the carriage makes this turn, it is supported and guided by a pair of carriage sprockets 80 (FIG. 2). These are mounted on the same shaft 19 as the upper primary sprockets 15. The carriage sprockets 80 are the same size as the upper primary sprockets and mesh with the carriage link 56. They serve the purpose of forcing the carriage to travel a predetermined arcuate path at this corner.

As the carriage traverses the carriage sprockets 80, the tops of the carriage links 51 are contacted on each side of the carriage by a pair of spring loaded guide rollers 73 (FIGS. 1 and 8). The guide rollers 73 hold the carriage against the carriage sprockets 80 making it follow the contour of the primary chains 13 as the individual links traverse the upper primary sprockets 15. The movement of the carriage about the upper primary sprockets 15 as it enters the downward return run is illustrated by the carriage 50b in FIG. 1. The guide rollers 73 can be satisfactorily mounted in a number of different ways. For example, as illustrated, each guide roller is supported on a pivotal arm 81, biased downwardly against the carriage by a spring 82. The whole structure is mounted on a suitable portion of the frame 28.

When all but the trailing end of the carriage has passed about the upper carriage sprockets 80, the carriage being flexible will by its own weight tend to assume a slightly draped position. This condition is illustrated by the carriage 50c (FIG. 1). In so doing, the effective length of the carriage between the lead link 52 and the hooks 60 will decrease, causing the hooked portion 60b of the hook to engage over and behind the hanger bar 71. Thus, on its downward travel, the carriage will in effect hang from the hanger bar by the hooks. It will be kept from swinging away from the primary chains 13 at its forward end by its permanent attachment at that point. The guide rollers 73 positively guide the hooks onto the hanger bar. This is one of their important functions.

It will be noted from FIG. 3 that the trailing link 53 of the carriages has only one of the carriage links 56, and that the pivot point between this carriage link and the next one to which it is connected is at the joint between the trailing link and the first adjacent intermediate link. This is important because it permits the trailing link to be pushed or rocked downwardly or radially inwardly by the guide rollers 73 as the carriage completes its passage about the carriage sprockets 80. This presses the hooks 60 down over the hanger bar 71, assuring engagement of the hooked portion 60b over the hanger bar 71. Should this hook for any reason fail to engage, the carriage would probably flip end for end about its front link 52. This would endanger personnel and could cause serious damage to the equipment. Thus, it is important that the mechanism be positive in obtaining engagement between the hooks and the hanger bar as the carriage enters its return path.

The carriage will in its hung or draped position traverse both the downward portion and the horizontal portion of the return run. The position of the carriage as it traverses the horizontal portion of the return run is illustrated by the carriage 50d in FIG. 1. As the carriage traverses the lower primary sprockets 17, it will once again be stretched to its full length. This stretching action will be completed as the trailing portion of the carriage passes about the sprocket 17. This once again shifts the hook 60 rearwardly, causing the hook portion 60b to disengage from the hanger bar 71, causing the carriage to be supported solely by the straight portion of the hook resting on this bar. Thus, the carriage will be restored to the condition illustrated in FIG. 6.

It will be understood that at the upper end of the conveyor, suitable means such as a length of conveyor track 83 is provided to receive the articles discharged from the carriages as they start to bend over the upper primary sprockets 15. The raised cross rod 55a will prevent discharge of the articles until the lead link 52 has been bent down sufficient to lower this rod to a point where the articles can pass over it.

Description of FIGS. 10–20

Figures 10, 11, 12:
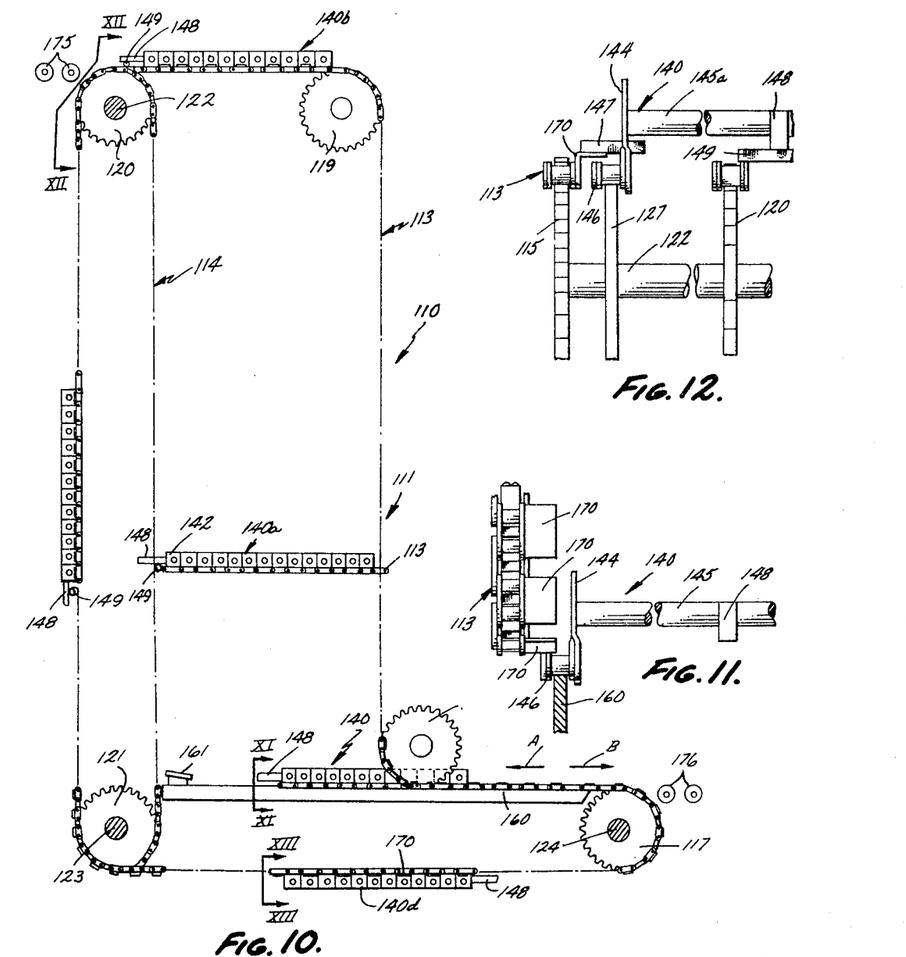
FIG. 10 is a schematic side elevation view of the reversible form of this invention.
FIG. 11 is a fragmentary, sectional view taken along the plane XI—XI of FIG. 10.
FIG. 12 is a fragmentary sectional view taken along the plane XII—XII of FIG. 10.

Referring specifically to FIG. 10, the numeral 110 indicates a vertical conveyor having a vertical portion 111 and a horizontal or platform portion 112 which may be a loading or unloading station, depending upon the direction of operation of the device. The vertical conveyor has a pair of primary chains 113 and a pair of secondary chains 114. The chains of the primary pair are arranged in parallel, laterally spaced relationship. The chains are of identical length. The same is true of the chains of the secondary pair 114. The secondary chains are positioned between the primary chains.

Figures 13, 14, 15, 16, 17:
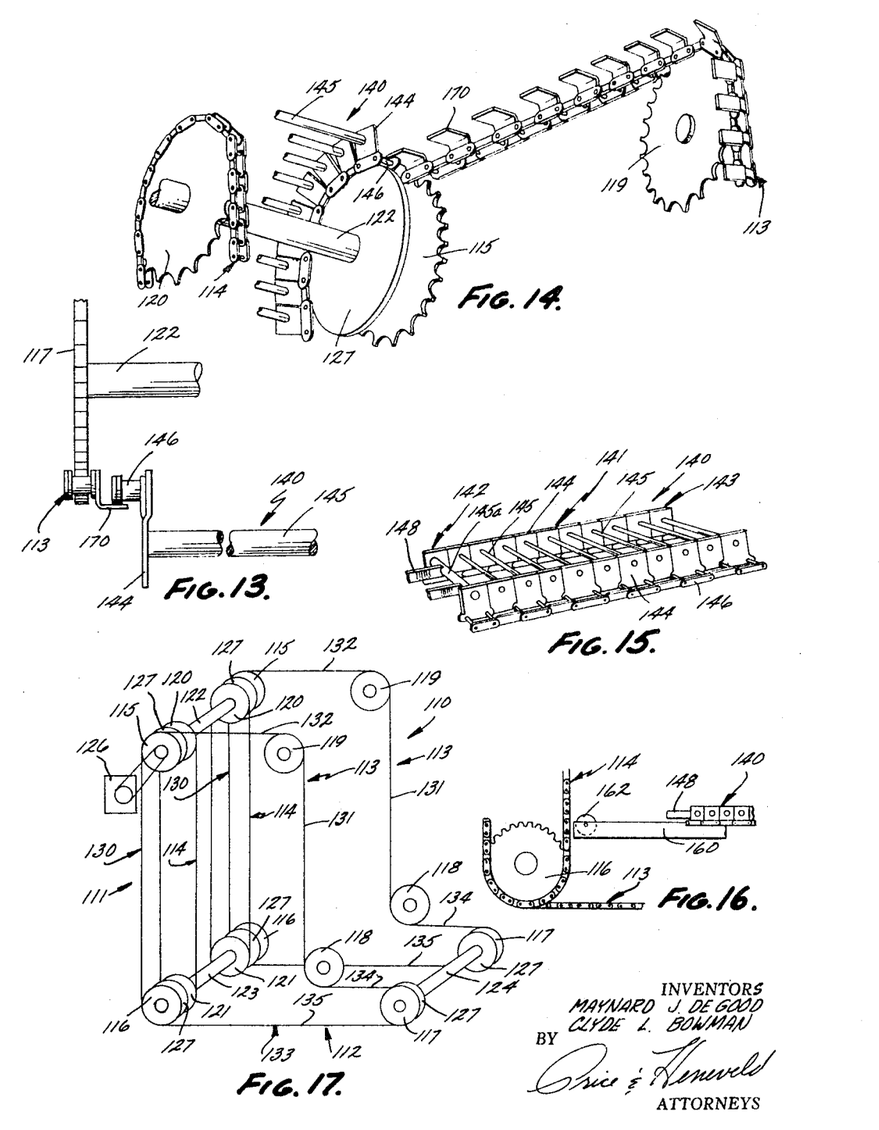
FIG. 13 is a fragmentary, sectional view taken along the plane XIII—XIII of FIG. 10.
FIG. 14 is a fragmentary, oblique view of one side of the upper portion of the form of the conveyor shown in FIG. 10.
FIG. 15 is a side elevation view of the carriage for the reversible form of this invention.
FIG. 16 is a fragmentary, side elevation view of a modified ramp for the carriage illustrated in FIG. 15.
FIG. 17 is an oblique, schematic view of the chain and sprocket arrangement of the reversible form of this invention.
Figures 19, 20:
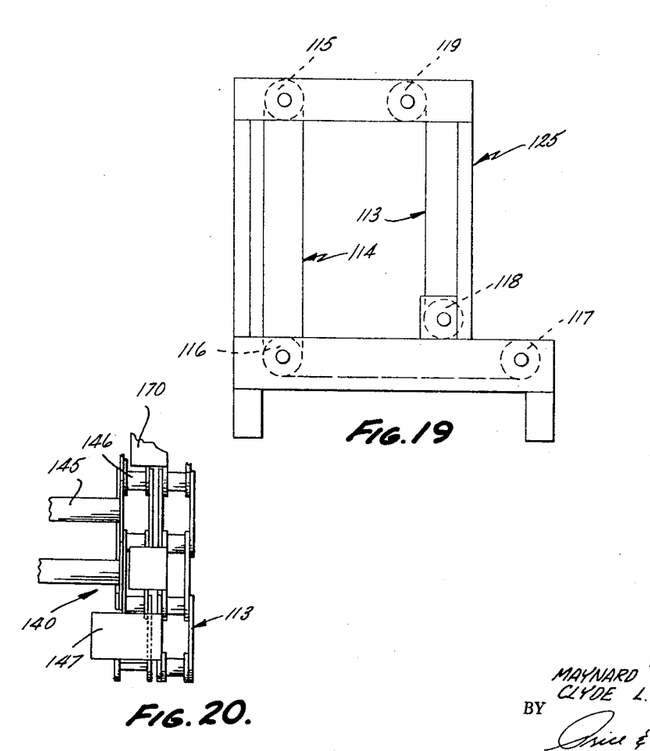
FIG. 19 is a schematic side elevation view of the reversible form of this invention showing its supporting frame.
FIG. 20 is a fragmentary view illustrating the clamping action of the primary chain on the carriage in the reversible form of this invention.

The chains of the primary pair 113 each pass over an upper primary sprocket 115, a lower primary sprocket 116, a platform sprocket 117, a lower corner sprocket 118, and an upper corner sprocket 119 (FIG. 17) The chains 114 of the secondary pair pass over an upper sprocket 120 and a lower sprocket 121. The sprockets 115 and 120 are mounted on a common shaft 122 and the sprockets 116 and 121 are mounted on the common shaft 123. The sprockets 117 are mounted on a common shaft 124. The sprockets 118 and 119 are individually mounted on stub shafts. All of these shafts are supported on the conveyor frame 125 (FIG. 19). The sprockets 115 and 120 and 116 and 121 are of identical size. The shaft 122 is driven by any suitable means such as the prime mover 126 (FIG. 17). This powers all of the chains, and thus, their speed and operation are synchronized. Any suitable speed reducing mechanism may be provided between the prime mover and the shaft 122. Also mounted on each of the shafts 122, 123 and 124 are a pair of carriage guide disks 127. The corners formed by the sprockets 115, 116 and 117 constitute the outside corners of the conveyor.

The primary chains 113 trace a generally L-shaped path having a vertical portion and a horizontal portion. The vertical portion of these chains has a first vertical leg 130 and a second vertical leg 131. These legs are substantially spaced creating a first or upper horizontal leg 132 at the top of the conveyor and a substantially longer second or lower horizontal leg 133 at the bottom of the conveyor. The second horizontal leg 133 has an upper run 134 and a lower run 135. The secondary chain pair 114 has a pair of parallel vertical runs extending between the upper and lower sprockets 120 and 121. One of these runs is in the same vertical plane as the first vertical leg 130 of the primary chain pair 113. The other run is parallel to and spaced from the second vertical leg 131 of the primary chain pair the length of the hereinafter described carriage.

The conveyor 110 is equipped with a plurality of carriages 140 arranged at equally spaced intervals. Each of the carriages is made up of a plurality of intermediate links 141, a free end link 142 and a captive end link 143 (FIG. 15). Each of the links consists of a pair of side plates 144 connected by a rod 145. The rod 145a of the free end link 142 is heavier than the other rods. The rods 145 and 145a collectively form a load supporting platform.

The links, at their lower ends, are joined together by tie links 146 which permit each link freedom of pivotal movement in one direction with relation to each adjacent link. The tie links stand out from the sides of the links 141, 142 and 143 to form a carriage supporting track, the importance of which will appear more fully hereinafter. The side plates 144 have straight, vertical end edges which abut when the carriage is straight as shown in FIG. 15. This abutment causes the carriage to lock-up in the manner of a stiff-back chain preventing the carriage from becoming concave. However, the carriage can freely flex convexly as is shown in FIG. 14.

Figure 18:
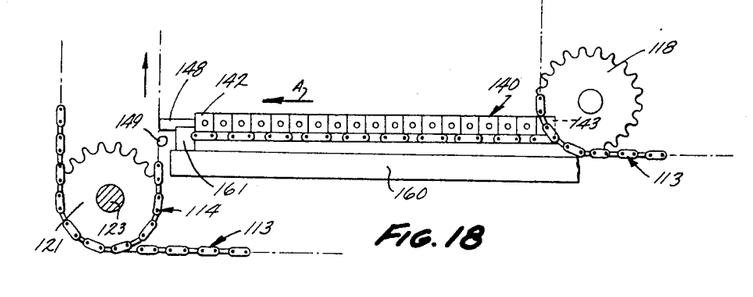
FIG. 18 is an enlarged, fragmentary, side elevation view showing the carriage approaching or just separating from the secondary chains of the reversible form of this invention.

The captive end link 143 is pivotally secured to the primary chain pair 113 by the connecting plate 47 (FIGS. 12 and 20). A pair of laterally spaced fingers 148 extend lengthwise from the rod 145a of the free end link 142. They cooperate with the lift members or bars 149 on the secondary chain pair 114 (FIGS. 10, 12, and 18). A plurality of the lift bars 149 extend between the chains of the secondary pair and are provided at equally spaced intervals coordinated with the spacing of the carriages.

Along the upper run of the lower horizontal leg 133 of the primary chain pair 113, a pair of rails 160 are provided parallel with the chains (FIGS. 11, 16 and 18). These are spaced to be beneath the track formed by the tie links 146 of the carriages and support the carriages as these traverse this upper run. The rails 160 extend from adjacent the sprockets 117 to adjacent the sprockets 121. The rails, preferably, are horizontal but may be inclined if the upper run of the primary chains is inclined.

Adjacent the second chain pair 114, the rails are equipped with ramp means which, as illustrated in FIGS. 10 and 18, are inclined ramping plates 161. These are inclined upwardly toward the secondary chains. The ramping plates 161 are spaced to engage the fingers 148. When the carriage is propelled in the direction of the arrow A in FIG. 10, that is the conveyor is being used to elevate, the ramping plates 161 serve to initiate a gradual upward movement of the end of the carriage in preparation for engagement by the approaching lift bar 149 (FIG. 18). This reduces the shock incident to the change in direction of movement as the carriage initiates its upward movement. When the movement of the carriage is in the opposite direction (arrow B, FIG. 10), the ramping plates 161 dampen the final change in direction of movement as the carriage is deposited on the rails 160 by the lift bar 149. FIG. 16 illustrates the fact that wheels 162 may be substituted for the ramping plates 161. This cushioning or dampening effect is important not only in reducing damage to the articles being transported, but to effectively increase the service life of the conveyor. It materially reduces the wear on the carriages, rails, lift bars and secondary chains.

The tie links 146 also engage the carriage guide disks 127 (FIGS. 12 and 14). The guide disks guide the carriage as it bends in changing from horizontal to vertical travel or vice versa. In the absence of these guide disks, the carriages would collapse inwardly toward the shafts 122, 123 and 124. The guide disks are simply circular plates having no sprocket teeth and rotated by the rotation of the shafts on which they are mounted.

The primary chains 113 are equipped with clamping plates 170 (FIGS. 14 and 20). The clamping plates are L-shaped and are provided on alternate links of the chains. Each clamping plate has an inwardly directed finger portion which extends laterally from the chains sufficiently that it overlies the tie links 46 of the carriages 140.

These clamping plates 170 serve several purposes. As the carriages are carried past the sprockets 115, 116 and 117, the clamping plates 170 hold the carriage against the guide disks 127, forcing the carriages to make a smooth transition around the bend (FIG. 14). When the carriages are traveling the first vertical leg 130, they are suspended from their upper or captive ends and the clamping plates hold the carriages to the chains, preventing them from swinging outwardly. When the carriages are traveling the lower run of the horizontal portion, the clamping plates form a supporting bed preventing the carriages from flexing downwardly (FIG. 13).

In the following description of operation, it will be assumed that the carriage 140 on the lower horizontal portion of the conveyor is moving in the direction of the arrow A (FIG. 10). When so moved, the conveyor is being used to elevate. It will be noted that the free end of the carriage 140 is being pushed along and supported by the rails 160. As its free end approaches the secondary chains 114, the fingers 148 will engage and ride up the ramps 161, initiating upward movement of this end of the carriage. The other or captive end of the carriage will also start moving upwardly because the primary chains 113 will have initiated their transition about the sprockets 118. As is clearly seen in FIG. 18, at the same time as this is occurring, one of the lift bars 149 will be brought up beneath the fingers 148. Upon engagement between the lift bars and the fingers, the carriage will be lifted off the ramps 161. At the same time, the other or captive end of the carriage will be carried around the sprockets 118 both lifting the carriage and pushing it further onto the lift bar. The length of the fingers 148 is such that this sliding movement may occur without interference. Thus, the shift from horizontal to vertical movement while rapid, is effected through a gradual change in direction, eliminating shock, wear and noise.

Thereafter, the carriage is moved vertically, suspended in level attitude between the primary and secondary chains as is illustrated by the carriage 140a in FIG. 10. When the carriage reaches the top of the conveyor, its movement changes from vertical to horizontal. Thus, it enters the upper loading or unloading station. The station serves either purpose depending upon the direction of operation of the conveyor. Again, because this is done gradually as the chains pass over the sprockets 115 and 119, shock is eliminated. Thus, the carriage 140b is moved to the left as illustrated in FIG. 10. Its free end continues to be supported by the engagement between the fingers 148 and the lift bar 149 until the links 146 at the free end of the carriage have moved over the guide disks 127. The carriage then will flex over the guide disks and start down the first vertical leg 130 of the primary chains 113. This action is illustrated in FIG. 14.

As the carriage reaches the top of the conveyor, it will move up under the clamping plates 170. Thus, as it enters the bend created by the sprockets 115 and 120 and the guide disks 127, it discharges its load onto any suitable receiving means such as a conveyor. Such a receiving conveyor is suggested in FIG. 10 by the two wheels 175. The holding effect of the clamping plates 170 prevents the carriage from tending to move outwardly off the end of the upper horizontal leg of the conveyor under the impact of its forward momentum.

The carriage remains trapped against the primary chains as it passes down the first vertical leg of the primary chains (carriage 140c, FIG. 10), passes about the lower sprockets 116 and 121 and guide disks 127, and traverses the lower run 135 of the lower horizontal leg 133 (carriage 140d, FIG. 10). As it travels this lower run, it is inverted and, except for the captive end link, is supported only by the clamping plates 170. The clamping plates 170 also hold it firmly to the path of the primary chains 113 as passage is made around the sprockets 117 and guide disks 127 to enter the upper run 134 of the lower horizontal leg 133. Here it receives a new load and initiates a repetition of the above described operation.

If it is desired to use the conveyor to lower articles rather than raise them, all that is required is to reverse the direction of travel of the chains. Thus, the carriages will enter the upper horizontal leg 132 of the conveyor by passing from the first vertical leg 130 over the sprockets 115 and 120 and the guide disks 127. As the carriage becomes an extended, level platform, the load will be placed on it from the conveyor represented by the wheels 175. The carriage will then be lowered to the lower horizontal leg where it will discharge its load onto the receiving conveyor represented by the wheels 176 as it folds over the sprockets 117. Thus, it will be moving in the direction of the arrow B in FIG. 10.

When the carriages 140 are moving in this direction, they are pulled rather than pushed along both the upper and lower horizontal legs. The ramps 161 reverse their function and serve to ease the free ends of the carriages off the lift bars 149. This reduces the velocity of downward movement gradually, eliminating the shock wear and noise which would result from the carriage suddenly being deposited on the rails 160.

To operate this continuous vertical conveyor, the primary and secondary chains 13 and 14 or 113 and 114 must be operated at the same speed and in complete synchronization. There are certain relationships which must be maintained between the length of the primary chains 13 or 113 and the length of the secondary chains 14 or 114. There are also relationships which must be maintained between the spacing of the lift blocks 62 and the number of carriages 50 (FIG. 1). For example, assuming the primary chains 13 have a length of twenty feet and five carriages are utilized having four foot spacings, the following relationships must apply. The length of the primary chain must be equally divisible by the spacing between the carriages. The number of lift dogs 62 must be such that their number is equally divisible into the total length of the secondary chain 14, and at the same time, they must be spaced a distance equal to the length of the carriages. Thus, any variation in the length of the carriage, must be reflected in a corresponding adjustment in the length of the chains, and this adjustment will in effect be a multiple of the adjusted length of the carriage and the number of carriages used. The same observations apply to the relationships between the lengths of the primary and secondary chains 113 and 114 and the spacing of the lift bars 149 and length of the carriages 140.

It will be seen that this invention provides a simple, yet highly effective and highly adaptable continous vertical chain conveyor. The complexity of the structure is materially reduced from that heretofore known. The speed with which it is operated may be adjusted through a wide range, the limitations basically being the rate at which articles can be properly moved onto the carriages as they are received by the conveyor. It will be seen that this vertical conveyor can be incorporated in fully automatic equipment, with the only requirement being that the equipment with which it is used be capable of sequentially timed release of articles onto the carriages as they move into article receiving position.

It will be seen that the construction shown in FIGS. 10–20 provides a simple vertical conveyor of materially increased versatility. It is immediately reversible without mechanical adjustment or modification and thus, has a far wider range of use than any conveyor of this type previously known to the art.

While two preferred embodiments of this conveyor have been illustrated and described, it will be understood that modifications of this invention may be incorporated without changing the principles of the invention. Such modifications as do not depart from the principles of the invention are to be considered as included in the hereinafter appended claims, unless these claims by their language expressly state otherwise.

We claim:

1. A vertical conveyor having a loading station at one end and an unloading station at the other end and a first pair and a second pair of endless chains synchronously driven at an identical speed with vertical portions thereof traveling between the loading and unloading stations; a plurality of carriages each capable of flexing under loads acting in one direction and locking up to form a rigid, flat platform under loads acting in the opposite direction; the carriages being aligned with and in the same vertical plane as the chains of the first pair of chains when traveling from the unloading station to the loading station; the first pair of chains having a horizontal leg at each of the stations, at least as long as the carriages; the vertical portions of the first and second pairs of chain traveling toward the unloading station being spaced apart the length of the carriages; the improvement in said conveyor comprising; each of said carriages being pivotally attached at one of its ends to and between the chains of the first pair of chains and at the other of its ends being free and having a support member; lift members attached to the chains of the second pair of chains in such spaced relationship that at least certain of the lift members are horizontally aligned with the pivotal connections of the carriages when the carriages are traveling the spaced apart vertical portions; the pairs of lift members engaging beneath the support members for supporting the carriages in extended horizontal position traveling vertically toward the unloading station.

2. The vertical conveyor described in claim 1 wherein means are provided on the first pair of chains for detachably engaging the carriage and holding it in general alignment with the first pair of chains when the carriage is traveling from the unloading station to the loading station.

3. The vertical conveyor described in claim 2 wherein a pair of supporting rails are provided at the lower of said stations for supporting the free ends of the carriages as they move between the first and second pairs of chain.

4. The vertical conveyor described in claim 3 wherein a ramp is provided at the ends of each of the supporting rails adjacent the second pair of chains for easing the free ends of the carriages on or off the rails as they are picked up or released by the lift members.

5. The vertical conveyor described in claim 2 wherein said means are clamping plates on the chains of the first pair of chains seating over at least a portion of the sides of the carriages; the lift members engaging the carriages to restrain them against pivot movement away from the clamping plates when the carriages are traveling from the unloading to the loading station.

6. The vertical conveyor described in claim 5 wherein said clamping plates are L-shaped members having one leg parallel to the side of said chains and a second leg projecting away from said chains; said second legs projecting toward each other.

7. A vertical conveyor as described in claim 3 wherein said ramp is a pair of plates inclined upwardly toward said other side of said second pair of chains.

8. A continuous vertical conveyor as described in claim 3 wherein said ramp means is a pair of wheels.

9. A continuous vertical conveyor having a pair of first chains traversing an L-shaped path having a vertical leg and a horizontal leg, the sides of said vertical legs being spaced apart; said horizontal leg having an upper run and a lower run; a second pair of chains traversing a closed vertical loop one side of which is coplanar with one side of the vertical leg of said first pair of chains; the other side of said second pair of chains being spaced horizontally from the other side of the vertical leg of said first pair of chains; a plurality of carriages each having one end pivotally fixed to said first pair of chains and a pair of fingers projecting from the other end thereof; said carriages having a length equal to the spacing between the non-coplanar vertical sides of said first and second pairs of chains; said carriages being formed from a plurality of connected links capable of permitting said carriages to flex convexly and locking together to support said carriages against flexing concavely; a plurality of lift members mounted on said second pair of chains; said lift members engaging said fingers when said left members are traversing the non-coplanar side of said second pair of chains; rails parallel with the upper run of said horizontal leg of said first pair of chains for supporting said other end of said carriages; the direction of travel of said first and second pairs of chains and of said carriages being reversible.

10. A vertical conveyor structure having a vertical portion and a generally horizontally portion; a first pair of laterally spaced, endless driven chains of identical length; said first pair of chains traversing both said vertical and horizontal portions; a second pair of laterally spaced, endless driven chains of identical length, said chains traversing only said vertical portion and being spaced from the vertical portion of said first pair of chains in a direction toward said horizontal portion; means driving both pairs of chains in synchronization and at the same speed; a plurality of flexible carriages each pivotally secured at its lead end to each of said chains of said first pair; a plurality of rest elements, at least one for each of said carriages mounted to said chains of said first pair adjacent the trailing end of said carriages and supporting said trailing end of said carriages when they are traveling said horizontal portion; a plurality of lift members arranged at equally spaced intervals in pairs, one of each pair on each of said chains of said second pair of chains, said lift members of each pair being at all times in the same horizontal plane; wing means on said trailing end of each of said carriages engaged by said lift members from beneath as said carriages approach said vertical portion for lifting said carriages in horizontal suspension as they traverse said vertical portion in one direction.

11. A vertical conveyor as described in claim 10 wherein said rest elements are horizontal bars attached to and extending between said chains of said first pair.

12. A lift structure as described in claim 10 wherein each chain of said first pair of chains has an operating run and a return run and in each run traveling a generally L-shaped path; each chain of said second pair of chains having an operating run and a return run and traveling an elongated loop-shaped path with said runs being generally parallel; a sprocket for each chain at each point the path of the chain changes direction; the sprockets at the end of the loop-shaped path of said second pair of chains being positioned to carry said chains into the area below said wings of said carriages in the generally horizontal portion of the operating run of said first pair of chains for moving a pair of said lift members into a position beneath said wing means of a carriage before the pivotal connection between said carriage and said first pair of chains has moved into the vertical portion of the operating run of said first pair of chains.

13. Means for supporting a flexible carriage in a multi-chain continuous conveyor, said chains being arranged in pairs with the chains of each pair being spaced apart laterally and said pairs being spaced apart in a direction normal to said lateral spacing; a sprocket for each of said chains of each of said pairs over which said chains pass and change direction; a flexible carriage pivotally secured at its leading end to the chains of one of said pairs; means on said second pair of chains for detachably supporting the trailing end of said carriage, said pairs of chains being spaced to hold said carriage in extended position as it approaches said sprockets; a pair of rails extending between said sprockets for one of said pairs of chains and the sprockets for the other of said pair of chains; ear means on each side of said trailing end of said carriage slidably engaging over said rails; one end of said rails being adjacent the sprockets for said other pair of chains for receiving said ears as said trailing end of said carriage passes over said sprocket.

14. Means for supporting a flexible carriage in a multi-chain continuous vertical conveyor as described in claim 4 wherein said means on said second pair of chains is a pair of dogs engaging said ear means for supporting said other end of said carriage; said ear means being elongated lengthwise of said carriage to simultaneously seat over both the ends of said rails and said fingers as said other end of said carriage traverses the last portion of its travel about the sprockets for said other pair of chains adjacent said rails to afford said other end of said carriage continuous support.

15. Means for storing a flexible carriage on a multi-chain continuous vertical conveyor as said carriage changes its direction of travel from generally horizontal to generally vertical downward and enters its return run, the leading end of said carriage being pivotally secured to and between said chains; support means detachably supporting said flexible carriage in stretched, extended condition; first sprockets for said chains over which said chains travel from a generally horizontal to a generally vertical downward path of travel; guide means over which said flexible carriage passes; hanger elements on said chains, one for each carriage, each spaced from the point of pivotal attachment of a carriage a distance slightly less than the length of said carriage; anchor elements on the trailing end of each carriage engaging over the adjacent one of said hanger elements as the length of said carriage shortens due to gravity as said carriage, passing over said sprockets, changes its attitude and initiates its downward movement; holding means engaging said carriage from above as it passes into its downward path for preventing said trailing end of said carriage from pivoting away from said chains, forcing said trailing end to descend in a path where said anchor elements will engage said hanger elements and said carriage will descend with its trailing end hanging from a hanger element.

16. Means for storing a flexible carriage as described in claim 15 wherein said hanger elements are bars mounted to and extending between said chains and said anchor elements are hooks.

17. Means for storing a flexible carriage as described in claim 15 wherein said holding means are rollers mounted to engage the surface of said carriage opposite from said chains; said rollers contacting said carriage at a point in relation to said sprockets where the portion of the carriage so contacted has initiated its downward movement.

18. Means for storing a flexible carriage as described in claim 17 wherein said hanger elements are bars mounted to and extending between said chains and said anchor elements are hooks; a rotatable guide for said carriage contacting the underside of said carriage, said rotatable guide being mounted for rotation about an axis concentric with said sprockets.

References Cited by the Examiner
UNITED STATES PATENTS

| | | | |
|---|---|---|---|
| 3,024,891 | 3/1962 | Sawrie | 198—153 |
| 3,184,039 | 5/1965 | Czarnecki | 198—153 |

References Cited by the Applicant
UNITED STATES PATENTS

| | | |
|---|---|---|
| 2,828,002 | 3/1958 | Sawrie. |

FOREIGN PATENTS

| | | |
|---|---|---|
| 456,746 | 11/1926 | Germany. |

ANDRES H. NIELSEN, *Primary Examiner.*

R. E. AEGERTER, *Assistant Examiner.*